(12) United States Patent
Doineau et al.

(10) Patent No.: US 11,738,344 B2
(45) Date of Patent: Aug. 29, 2023

(54) PARTICLE SORTING IN A MICROFLUIDIC SYSTEM

(71) Applicant: HIFIBIO SAS, Paris (FR)

(72) Inventors: Raphael Clément Li-Ming Doineau, Paris (FR); Arnaud Reitz, Guyancourt (FR); Marcel Reichen, Waedenswil (CH)

(73) Assignee: HIFIBIO SAS, Paris (FR)

( * ) Notice: Subject to any disclaimer, the term of this patent is extended or adjusted under 35 U.S.C. 154(b) by 0 days.

(21) Appl. No.: 16/648,538

(22) PCT Filed: Sep. 19, 2018

(86) PCT No.: PCT/EP2018/075393
§ 371 (c)(1),
(2) Date: Mar. 18, 2020

(87) PCT Pub. No.: WO2019/057794
PCT Pub. Date: Mar. 28, 2019

(65) Prior Publication Data
US 2020/0215545 A1 Jul. 9, 2020

(30) Foreign Application Priority Data

Sep. 19, 2017 (EP) .................................. 17191962

(51) Int. Cl.
| | | |
|---|---|---|
| *B01L 3/00* | (2006.01) | |
| *G01N 15/10* | (2006.01) | |
| *G01N 15/14* | (2006.01) | |

(52) U.S. Cl.
CPC ... *B01L 3/502761* (2013.01); *B01L 3/502776* (2013.01); *B01L 3/502784* (2013.01); *B01L 2200/0636* (2013.01); *B01L 2200/0652* (2013.01); *G01N 2015/1006* (2013.01); *G01N 2015/149* (2013.01)

(58) Field of Classification Search
CPC ......... B01L 3/502761; B01L 3/502776; B01L 2200/0636; G01N 2015/149
See application file for complete search history.

(56) References Cited

U.S. PATENT DOCUMENTS

| | | | | |
|---|---|---|---|---|
| 2005/0178727 | A1* | 8/2005 | Takagi | B01D 11/02 210/634 |
| 2005/0221333 | A1* | 10/2005 | Sundararajan | C12Q 1/6827 435/6.19 |
| 2006/0073599 | A1 | 4/2006 | Weigl et al. | |
| 2010/0112723 | A1* | 5/2010 | Battrell | B01L 3/50273 436/501 |
| 2012/0211084 | A1 | 8/2012 | Weitz et al. | |
| 2016/0215411 | A1* | 7/2016 | Ismagilov | B01F 5/0647 |

FOREIGN PATENT DOCUMENTS

| | | | | |
|---|---|---|---|---|
| WO | WO-2015088299 | | 6/2015 | |
| WO | WO-2015200893 | A2 * | 12/2015 | ............. C40B 20/04 |

OTHER PUBLICATIONS

Smallwood (Handbook of organic solvent properties. Butterworth-Heinemann, 2012.) (Year: 2012).*

* cited by examiner

*Primary Examiner* — Sahana S Kaup
(74) *Attorney, Agent, or Firm* — McCarter & English, LLP; Yu Lu; James M. Alburger

(57) ABSTRACT

The invention relates to a method for ordering, sorting and/or focusing particles in a first microfluidic channel system, the method comprising the steps of i) providing for a first microfluidic channel comprising at least a first and a second inlet and a first outlet, ii) injecting a first fluid into the channel through said first inlet, iii) injecting a second fluid into the channel through said second inlet, wherein the viscosity of the first fluid is higher than the viscosity of the second fluid, such that the two fluids flow in a laminar fashion unmixed side by side, and one of the two fluids comprises the particles to be ordered, sorted and/or focused. The invention also relates to a microfluidic channel system for sorting different particles into one droplet.

18 Claims, 12 Drawing Sheets

| Encapsulation Rate Analysis | Experimental Result | Enrichment compared to Poisson law |
|---|---|---|
| P(Xgreen = 0; Xred = 0) | 9,3% | 0.69x |
| P(Xgreen = 1) = P(Xred =1) | 42,5% | 1.16x |
| P(Xgreen = 1; Xred =1) | 18,10% | 1.34x |
| P(Xgreen = 1 or 2; Xred = 1 or 2) | 42,60% | 1.4x |

Reporter cells ordering + B cells 2-cell ordering for paired encapsulation

Intercellular temporal spacing (μs in $Log_{10}$ scale)

PARTICLE SORTING IN A MICROFLUIDIC SYSTEM

CROSS-REFERENCE TO RELATED APPLICATIONS

This application is a national stage filing under 35 U.S.C. § 371 of International Application No. PCT/EP2018/075393, filed Sep. 19, 2018, which claims the benefit of and priority to European Patent Application No. 17191962.4, filed on Sep. 19, 2017, the contents of all of which are incorporated by reference herein in their entirety. International Application No. PCT/EP2018/075393 was published under PCT Article 21(2) in English.

FIELD OF THE INVENTION

The invention is in the field of microorganism strain development, antibody creation, antibody analysis all by means of microfluidic devices. The present application is in the field of cell culture and cell analysis in and through microfluidic devices and systems. The application is also in the field of microfluidics, particularly in the field of microfluidic analysis and devices as well as the development of cell sorting, cell ordering and/or focusing. Various systems, methods and devices are provided for focusing particles suspended within a moving fluid into one or more localized stream lines.

BACKGROUND

Particle separation and filtration has been applied for numerous technological solutions in industry, medicine and research. Various macroscale techniques have been developed for particle separation to address these applications. Microscale techniques offer advantages, in that scaling down allows the use of unique hydrodynamic effects and intensifies electromagnetic separation forces. Dielectrophoretic forces have been used to discriminate particles based on size or some dielectric tags. Other techniques for continuous separation rely on the laminar flow profile and different intersected cross sections of the flow for particles of varied sizes aligned at a wall. Further microscale techniques involve precisely designed filters or post arrays that create a bifurcation in particle direction based on size. These techniques can produce very accurate separations depending on the size or the dielectric properties of particles. For example, for deterministic displacement by asymmetrically aligned obstacles, a resolution of less than 20 nm is reported for particles of 1 μm in diameter. Additionally, complexity can be low in these systems.

A disadvantage of current microscale separation systems is that scaling usually limits the throughput of these techniques. In most cases, particle volume fractions are maintained well below 1%, since particle-particle interactions can drastically affect performance. Additionally, small volumetric flow rates can lead to large average fluid velocities in microchannels leading to insufficient time for separation forces to act on particles. Typical flow rates ranging from 1 to 50 μL/min for these systems is insufficient for many preparative applications (e.g., concentration of rare cells in large volumes of blood, filtration of ultrasound contrast agents or preparation of large amounts of colloids/emulsions). One of the fundamental problems in using microdroplets or droplets (emulsions) as confined space in a microfluidic system is filling a large percentage of droplets with the desired specimen. For example, one would like to bring i) two different cells in one droplet, ii) one cell and one probe in one droplet, iii) an antigen and an antibody in one droplet, iv) an antigen and a B or a T-cell in one droplet or v) a chemical substance and a bacterial cell or the like in one droplet. However, following a Poisson distribution, the majority of droplets will not comprise the desired combination. It would be helpful to have, a number of systems, devices, apparatus and methods that result in and use the self-ordering of particles suspended in a fluid traveling through a microfluidic channel. This would be helpful for focusing particles suspended within a moving fluid into one or more localized stream lines. It would be helpful to have a substrate and at least one channel provided on the substrate having an inlet and an outlet for focusing cells in such a system. It would be also advantageous to have a channel in a laminar flow having suspended particles and a pumping element driving the laminar flow of the fluid so that cells are sorted therein into one or more stream lines. Further, it would be helpful to have a method which provides a deterministic approach for assessment of distribution and/or localization of particles within a microfluidic channel. The inventors have solved these problems.

SUMMARY OF THE INVENTION

The invention relates to a method for ordering, sorting and/or focusing particles in a first microfluidic channel system, the method comprising the steps of i) providing for a first microfluidic channel comprising at least a first and a second inlet and a first outlet, ii) injecting a first fluid into the channel through said first inlet, iii) injecting a second fluid into the channel through said second inlet, wherein the viscosity of the first fluid is higher than the viscosity of the second fluid, such that the two fluids flow in a laminar fashion unmixed side by side, and one of the two fluids comprises the particles to be ordered, sorted and/or focused.

The invention also relates to a microfluidic channel system comprising i) a first microfluidic channel comprising at least a first and a second inlet and a first outlet, ii) a first fluid, iii) a second fluid, wherein the viscosity of the first fluid is higher than the viscosity of the second fluid, such that the two fluids can flow in a laminar fashion unmixed side by side, and one of the two fluids comprises particles to be ordered, sorted and/or focused.

DETAILED DESCRIPTION OF THE INVENTION

The invention relates to a method for ordering, sorting and/or focusing particles in a first microfluidic channel system, the method comprising the steps of i) providing for a first microfluidic channel comprising at least a first and a second inlet and a first outlet, ii) injecting a first fluid into the channel through said first inlet, iii) injecting a second fluid into the channel through said second inlet, wherein the viscosity of the first fluid is higher than the viscosity of the second fluid, such that the two fluids flow in a laminar fashion unmixed side by side, and one of the two fluids comprises the particles to be ordered, sorted and/or focused.

The inventors have astonishingly found that by "mixing" fluids of differing viscosities it is possible to stably organize the flow of particles in a channel. Mixing of course does not mean mixing in the common sense but to the contrary here it means bringing, e.g. two fluids of differing viscosity together such that and in a way that they flow in a laminar manner in parallel for as long as possible without mixing with one another. The effect of this parallel stream of the two fluids is that the particles in one of the two streams are confined to exactly that stream. Such a stream or fluid stream line can be used to bring the particles into a desired space or position. In a preferred aspect of the present invention such streams are used to bring specifically two different particles or cells into one droplet.

The channel can have a hydraulic diameter and a ratio of a size of the particles focused to the hydraulic diameter that is greater than or equal to about 0.07. The ratio of particle size to hydraulic diameter can be less than or equal to about 0.5.

The one or more focused stream lines can have a width that is less than or equal to about five times, four times, three times, two times, and/or 1.5 times a size of the focused particles. Embodiments of the system can increase the concentration of particles in solution.

A detector can be applied to enumerate particles traveling in the localized flux of particles in the channel. Methods can further include a system for tagging selected particles with a tag that can be detected by a detector, the detector thereby detecting and enumerating the selected particles.

Differently from other methods known in the art, the localization of the particle(s) within the fluidic system composed by a first and a second fluid is essentially controlled by visco-elastic or viscous forces or combination thereof. Accordingly, in one embodiment, the Reynolds number characterizing the fluidic system disclosed herein is less than 1.

In any and all aspects, methods can include systems in which the focusing can result exclusively from the visco-elastic or viscous forces. Other method embodiments can include systems in which the focusing can result from visco-elastic or viscous and other forces. In any of the aspects, embodiments can include an apparatus, wherein the cross-sectional shape and area of the channel can be consistent from the inlet to the outlet. In other embodiments, the cross-sectional shape and area of the channel can vary from the inlet to the outlet. The one or more localized stream lines can have a width that is less than or equal to about five times, four times, three times, two times, and/or 1.5 times the predetermined particle size. Moving the fluid suspension having particles of a predetermined size from the inlet to the outlet focuses the particles of a predetermined size into four localized streams, two localized streams, and/or a single localized stream.

In the enumerated aspects or in any of their embodiments, methods for separating target particles from a population of particles can be provided wherein the dividing is done passively. The target particles can have a different size than other particles in the population and the target particles can form a localized flux in a predetermined location within the channel. In some embodiments, an entrance to the first output branch can be located so as to encompass the predetermined location within the channel of the localized flux of target particles. Embodiments of the method can also include selectively tagging particles with a tag that is used by a dividing system operatively connected to the channel. The tag can increase the size of the selectively tagged particles and the tag can be a magnetic tag.

In the present invention, the particles are comprised preferably in the second fluid and the viscosity of the first fluid is selected such that the particles in the second fluid are confined by the first fluid to the space occupied by the second fluid. As can be seen in FIG. 4, the two inlets provide for the two fluids which meet at the junction of the inlets. Once the fluids come together they travel separately due to the different viscosities. As a consequence, particles in each fluid are confined to the space that fluid has in the channel. The particles thus travel in an ordered manner, behind one another. This means this order may again be used for other applications.

In the present invention, preferably the height of the first microfluidic channel is selected from the group of between 2 µm and 60 µm, 5 µm and 50 µm, 10 µm and 45 µm, 15 µm and 40 µm, 25 µm and 35 µm.

In the present invention, preferably the width of the first microfluidic channel is selected from the group of between 2 µm and 150 µm, 5 µm and 125 µm, 25 µm and 100 µm, 40 µm and 85 µm, 50 µm and 70 µm. More preferably, the width of the first microfluidic channel is about 60 µm.

In another embodiment, the width of the first and/or the second microfluidic channel is inversely proportional to the viscosity of the fluid being transported.

In another embodiment, the width of the first and/or the second microfluidic channel is inversely proportional to the size of the particles.

Ideally, the first inlet and the second inlet enter into the microfluidic channel at substantially the same position in a Y-shaped manner. This geometry ensures that the two fluids do not mix quickly but travel in parallel. Thus, ideally, the angle between the first inlet and the second inlet is below or equal to 180°.

Preferably, in the method according to the invention the ordering channel is substantially straight and has a length selected from the group of, between 1 mm and 40 mm, 2 mm and 35 mm, 5 mm and 25 mm, 8 mm and 20 mm, 10 mm and 20 mm, and 12 mm and 18 mm.

Preferably, the first and the second fluid are aqueous fluids and the viscosity of the first fluid is between 100 cP and 2000 cP, and the viscosity of the second fluid is between 0.001 cP and 2 cP.

More preferably, the viscosity of the first fluid is selected from the group of between 100 cP and 2000 cP, between 200 cP and 1500 cP, between 300 cP and 1200 cP, and between 500 cP and 1000 cP.

More preferably, the viscosity of the second fluid is selected from the group of between 0.001 cP and 100 cP, between 0.010 cP and 50 cP, between 0.250 cP and 10.0 cP, and between 0.5 cP and 1.0 cP.

In a further embodiment, the first and the second fluid are aqueous fluids and the viscosity of the first and second fluid is between 0.001 cP and 100 cP.

In another embodiment, the second fluid has a viscosity of about 1 cP. In a further embodiment, the first fluid has a viscosity twice as the second fluid.

In one embodiment, the residence time of the fluidic system disclosed herein is sufficient to ensure a viscosity gradient between the first and second fluid. The residence time is a measurement determined by different parameters such as the composition of the first and second fluid, the flow rate and the length of the channel.

It is preferred that the aqueous first fluid comprises a substance selected from the group of, an organic polymer, a natural polymer, cellulose, glucose, fructose or any other sugar, DNA, RNA, poly(ethylene glycol), poly(ethylene glycol) diacrylate, bis-acrylamide, polyacrylamide, strepta-vidin-acrylamide, poly-N-acrylamide, poly N-isopropylpo-lyacrylamide, agarose, alginic acid or mixtures thereof. As used herein, the term "organic polymer" refers to polymer obtained by chemical synthesis consisting of monomers comprising mostly carbon and hydrogen elements, which can be combined with any of additional elements, non-limited to, oxygen, nitrogen and sulfur. In the context of the present invention, an example of organic polymer can be a synthetic peptide or protein. As used herein the term "natural polymer" refers to polymer occurring in nature consisting of monomers comprising mostly carbon and hydrogen elements, which can be combined with any of additional elements, non-limited to, oxygen, nitrogen and sulfur. In the context of the present invention, an example of natural polymer can be hyaluronic acid. Natural or synthetic polymers may also encompass oils and their derivatives.

In one embodiment, the viscous aqueous first fluid comprises a substance selected from the group comprising non-polymeric oils and their derivatives, such as fluorinated oils (see, for example, FIG. 9.

In one embodiment, the first outlet is an emulsion outlet and the at least one particle is encapsulated in a droplet when it leaves the first outlet.

In one embodiment, the microfluidic system comprises a third inlet. In this embodiment the higher viscous fluid can be used to separate the less viscous fluids; see for example FIG. 1.

In this embodiment, the third fluid is injected in the third inlet and the viscosity of the three fluids is selected such that the first fluid separates the second fluid from the third fluid and all three fluids flow in a laminar manner substantially unmixed for at least the length of the ordering channel.

The particle may be selected from the group comprising a cell, a eukaryotic cell, a prokaryotic cell, a bead, an antibody or a fragment thereof, an antigen or the like. As outlined above, it is preferred if there are two different cell types and they are brought together in an ordered manner in one droplet.

Preferably in such a method more than 20%, 30%, 40%, 50%, 60%, 70%, 80%, 90% or 95% of the droplets that contain two cells have the two desired cells.

The invention also relates to a method for ordering, sorting and/or focusing particles wherein a first microfluidic channel system according to the invention is combined with a further microfluidic channel system according to the invention and the outlets of both systems are joined in one common channel. This embodiment is shown in FIG. 2. Thus, the invention relates also to a system of 2 or more microfluidic channels coming together at a junction, wherein at least two of the 2 or more channels is loaded with two fluids flowing in parallel, one of which having a higher viscosity than the other.

Claimed is also a microfluidic channel system comprising i) a first microfluidic channel comprising at least a first and a second inlet and a first outlet, ii) a first fluid, iii) a second fluid, wherein the viscosity of the first fluid is higher than the viscosity of the second fluid, such that the two fluids can flow in a laminar fashion unmixed side by side, and one of the two fluids comprises particles to be ordered, sorted and/or focused.

The invention also relates to the use of a method according to the invention or a system according to the invention for sorting to different particles into one droplet. As used herein, the term "different particles" can refer to a plurality of the same or distinct particles.

Differently from other methods known in the art, a further advantage of the method and system disclosed herein is that by means of mixing two fluids of different viscosities is it possible to control the positioning of particles in the microfluidic system before their encapsulation in a droplet. This superior control of the particles within the fluid allows a precise encapsulation of at least one particle into a single droplet without adopting a high flow rate, which would affect negatively the encapsulation step.

Accordingly, in another embodiment, the method and/or system according to the present invention allows the encapsulation of at least one particle per droplet. More preferably, the method and/or system according to the present invention allows the encapsulation of only one particle per droplet.

The invention relates also to a system comprising two or more microfluidic channels coming together at one junction, wherein at least two of the two or more channels are loaded with two fluids flowing in parallel, one of which having a higher viscosity than the other. Here, one channel may transport a particle (see definitions above of what a particle may be) and the other a different particle. At the junction where they come together a droplet is formed. This may be repeated to incorporate a third or further particle.

DETAILED DESCRIPTION OF THE FIGURES

FIG. 1 shows a general mask design for the co-encapsulating particles in droplet using a device according to the present invention.

FIGS. 2A-C shows particular mask designs for the co-encapsulating particles in droplet device according to the present invention.

Figure 1:
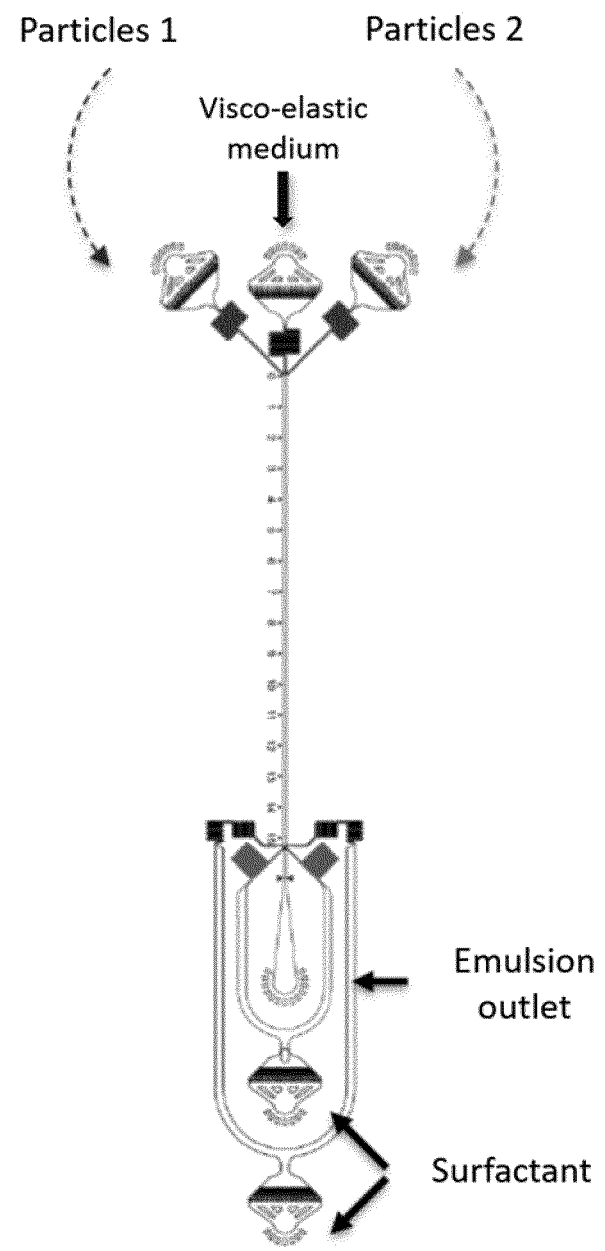
Figure 2A:
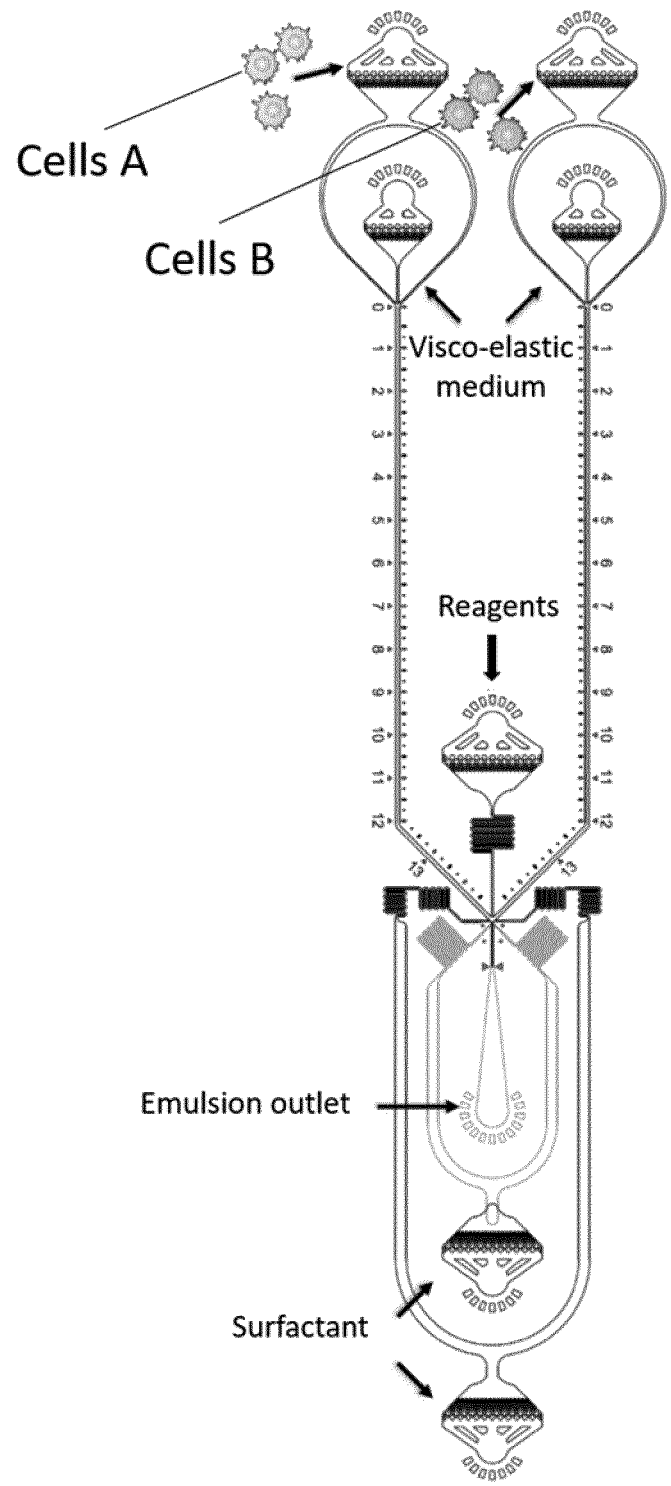
Figure 2B:
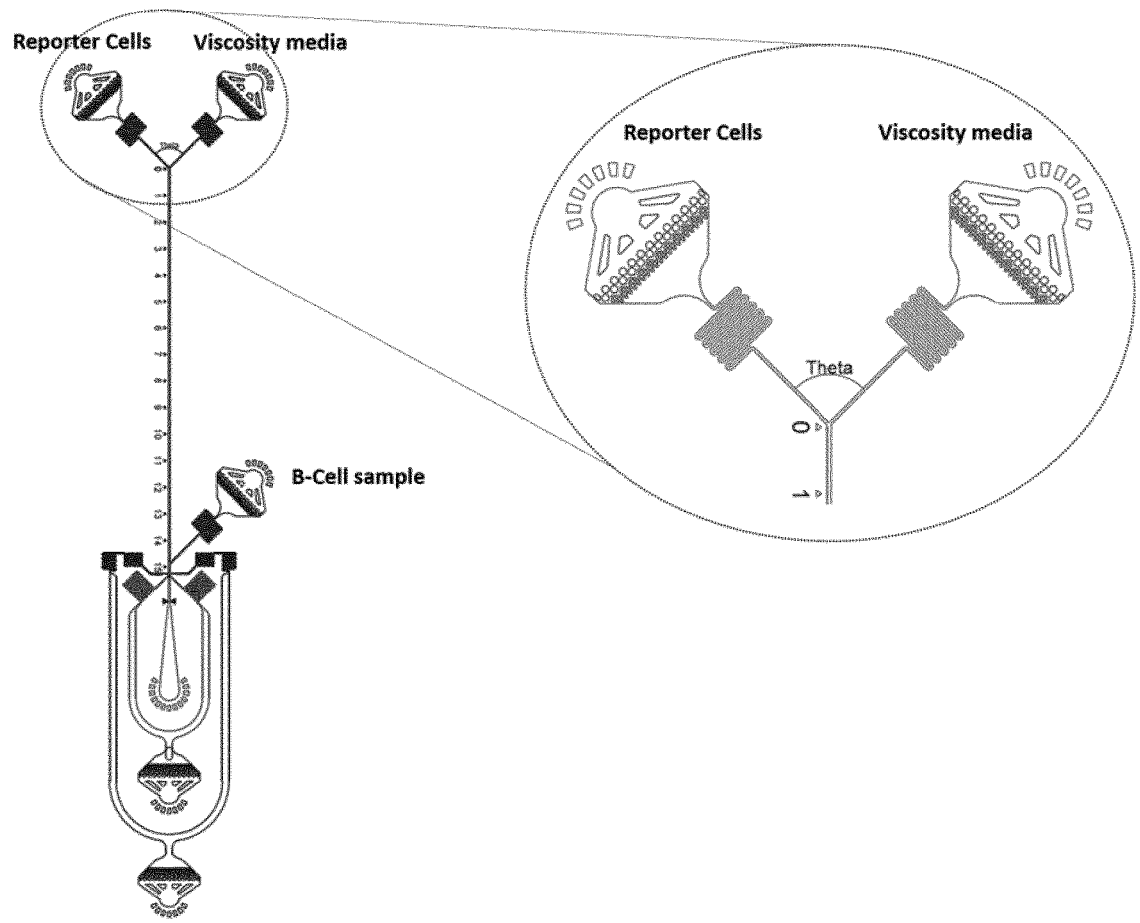
Figure 2C:
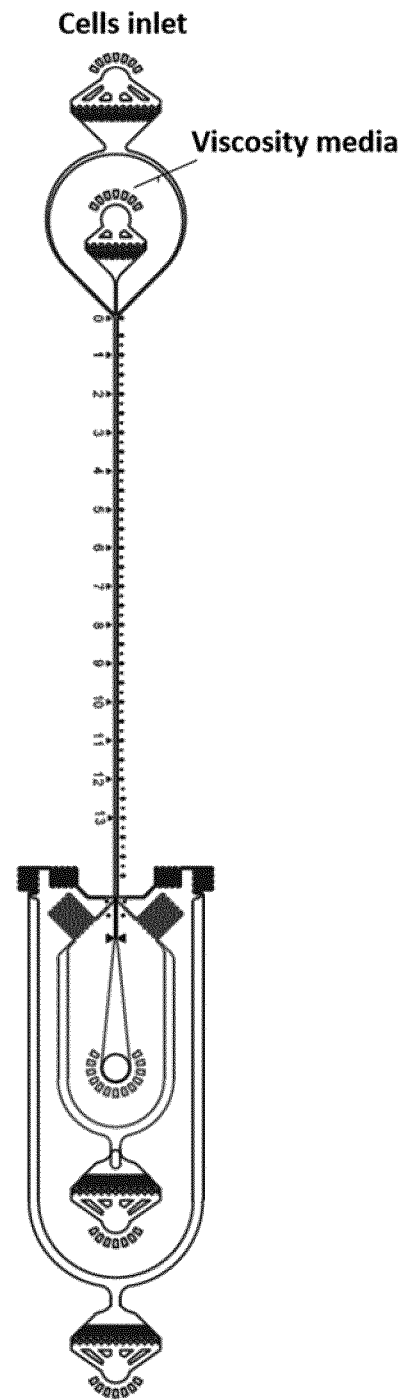
Figure 3:
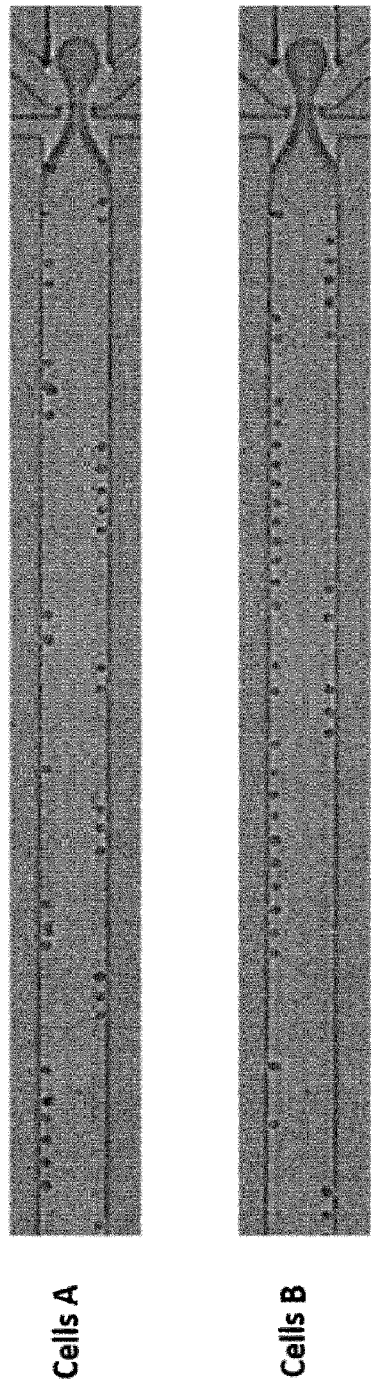
FIG. 3 shows different distribution of set of cells A and B in their respective channels prior to co-encapsulation. In both channels, cells are confined by a stream viscous media, as shown in FIG. 2.
Figures 4, 5:
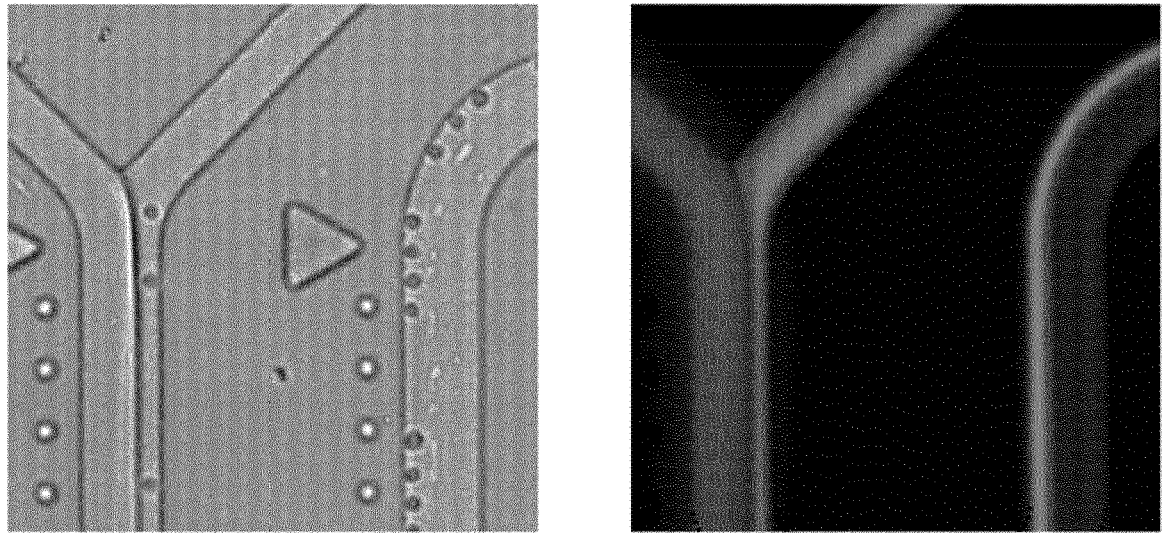
FIG. 4 shows the laminar stream of the two fluids.
FIG. 5 shows the better enrichment of particles as compared to the Poisson distribution, in microfluidics device depicted in FIG. 1 or 2.
Figure 6:
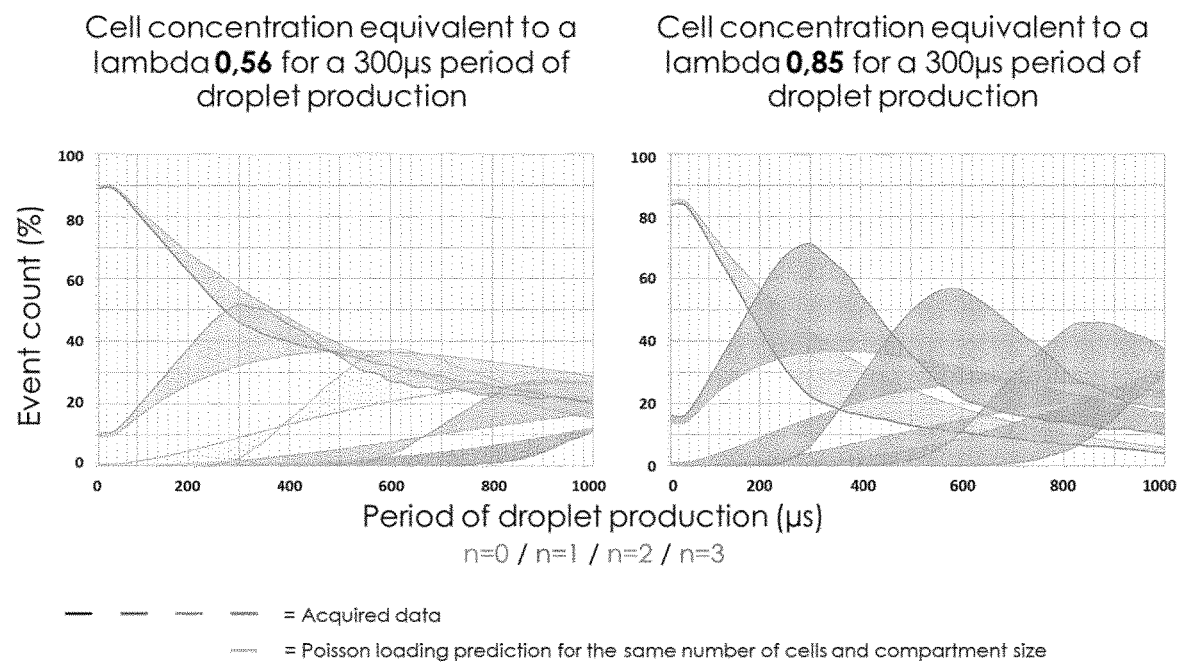

FIG. 6 shows the probability mass function of single particle/cell encapsulation following Poisson statistics or experimental data. It shows cell concentration equivalent to a lambda 0.56 for 300 µs period of droplet production and cell concentration equivalent to a lambda 0.85 for 300 µs period of droplet production.

Figure 7:
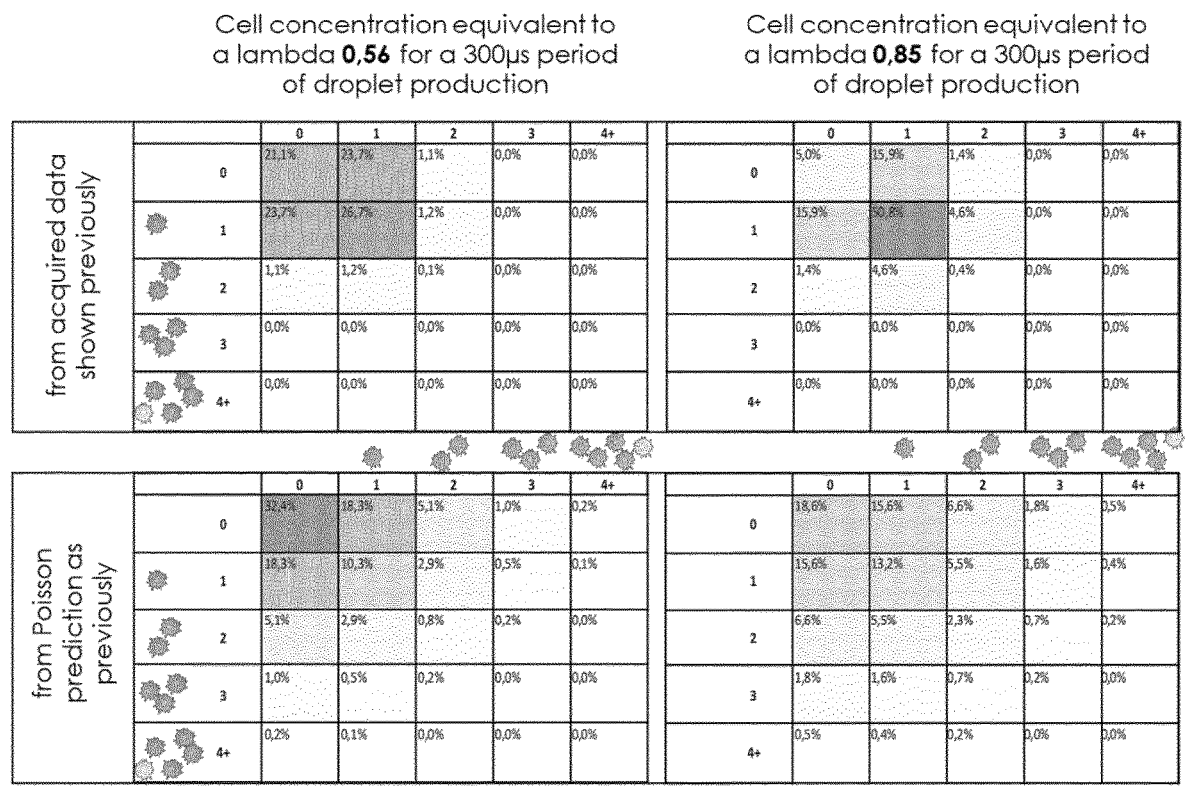

FIG. 7 shows the particle/cell co-encapsulation probability of the method according to the present invention, wherein the cell concentration is equivalent to a lambda 0.56 for 300 µs period of droplet production and to a lambda 0.85 for 300 µs period of droplet production.

Figure 8:
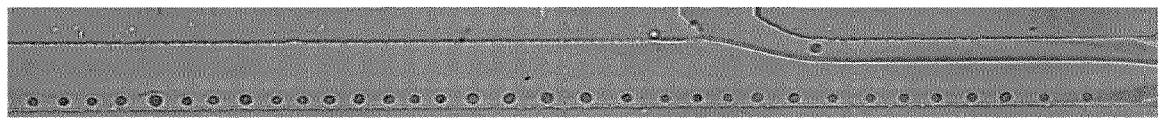
Figure 8:
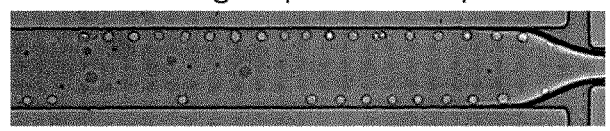

FIG. 8 shows distribution of the cells in the microfluidic channels according to the present invention.

Figure 9:

FIG. 9 shows ordering of particles/cells in a microfluidics device, where the ordering viscous media consists in fluorinated oil.

Figure 10:
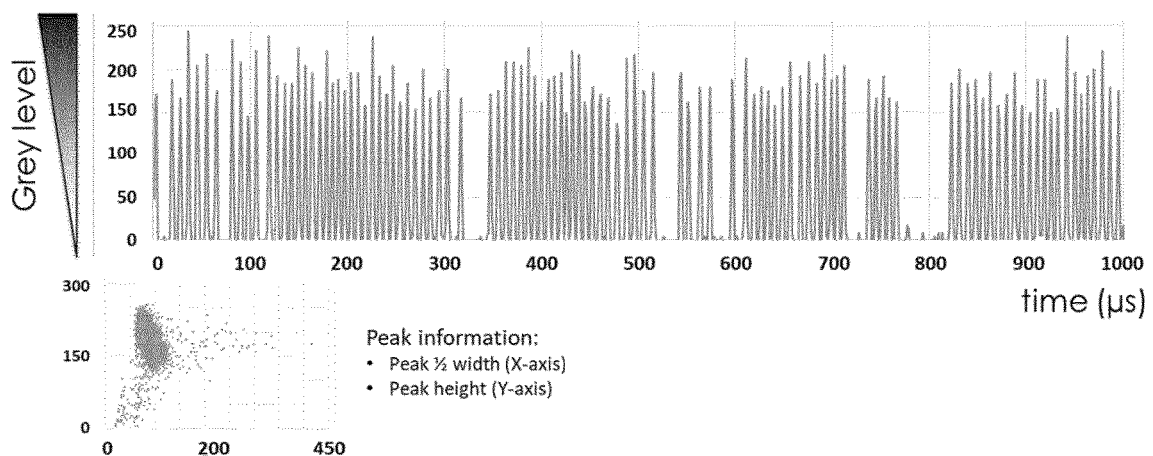

FIG. 10 shows the method for analyzing the cell temporal positioning in a micro-channel.

Figure 11:
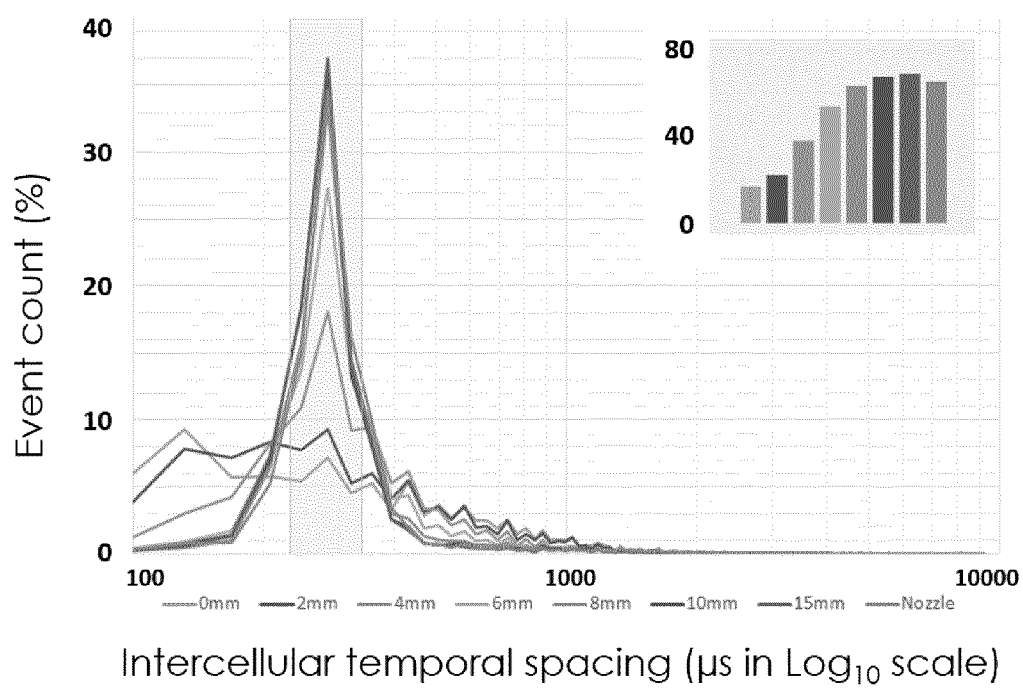

FIG. 11 shows the analysis of the inter-cellular spacing flowing after a determined length of channel, based on the method described in FIG. 10.

Figure 12:
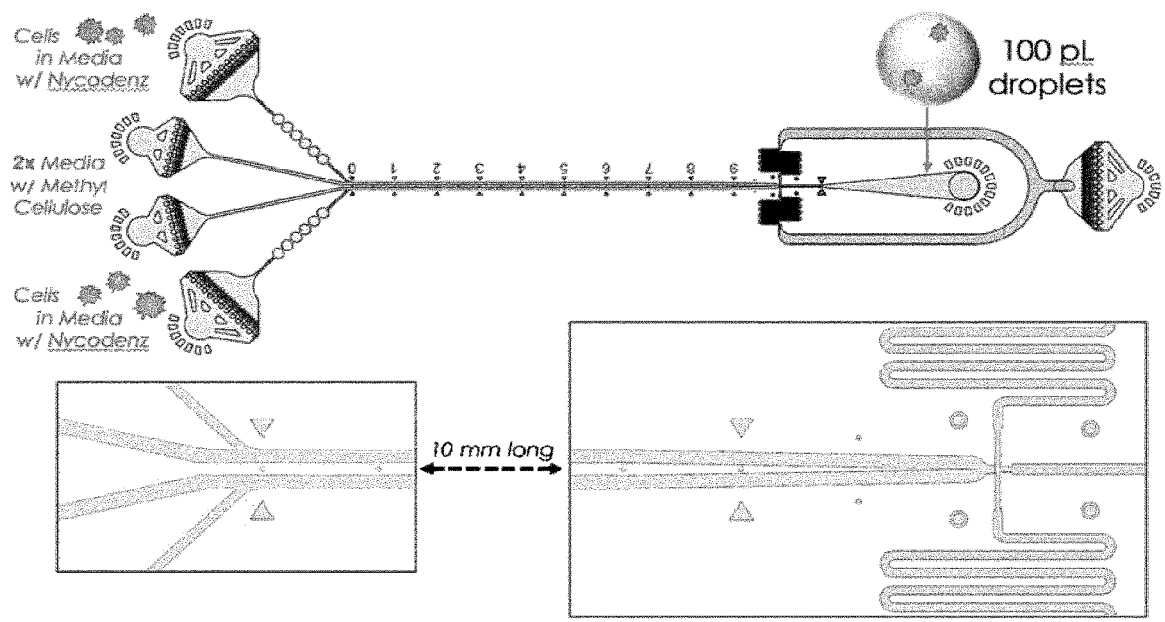

FIG. 12 shows a particular mask design for the co-encapsulating particles/cell in droplet using a device according to the present invention achieving better co-encapsulation of particles in droplet compared to Poisson statistics described in FIGS. 6 and 7.

EXAMPLES

Microfluidic Chip Device Design, Fabrication & Preparation

All microfluidic devices were designed using a 2D computer aided design (CAD) software (AutoCAD 20, Autodesk). Prior to coating SU-8, 4" silicon wafers were dried at 200° C. for at least 5 min on a hotplate.

A SU-8 layer was applied on a wafer by spin coating SU-8 resin (SU-8-2025 or SU-2035, MicroChem) at 2000-4000 RPM as final speed for 30 sec followed by a pre-bake first at 65° C. for 1-3 min and then at 95° C. for 3-10 min and left to cool down to room temperature before UV exposure. SU-8 coated wafers were 365 nm UV exposed through a high resolution transparency mask (JD Photo Tools, UK) using a mask aligner (MJB4 contact mask aligner, SUSS MicroTec) to structure the microchannels. The mask aligner was used in WEC contact mode and exposing the resin for typically 10-40 sec with a dose of 10-16 mW/cm$^2$. Exposed SU-8 coated wafers were post-baked first at 65° C. for 1-3 min and then at 95° C. for 1-10 min and left to cool down to room temperature before development. Post-baked SU-8 wafers were developed using PGMEA (Microchem, Y020100) for 1-10 min in a glass container on an orbital shaker at 100 RPM and wafers were subsequently dried with nitrogen and hard-baked at 200° C. for at least 5 min. Microchannel heights on the SU-8 mold were measured with a contact stylus profilometer (Dektak 6M, Veeco) or white light interferometry (NT9100, Veeco). Polydimethylsiloxane (PDMS) (Sylgard 184, DowCorning) was mixed in a ratio of 1:10 (curing agent:base agent) in a dish and poured over the SU-8 mold. PDMS was subsequently degassed in a vacuum desiccator for several minutes to remove air bubbles from the mold. PDMS was cured at 70° C. in an oven (VWR, France) for 2 hr. Cured PDMS was peeled off the mold and holes for inlet and outlet ports punched with a 0.75 mm biopsy punch (Harris, USA). Punched PDMS slabs were cleaned from particles and dust using Scotch tape followed by rinsing with isopropanol and de-ionized water. Cleaned PDMS slabs were dryed using pressurised nitrogen. The microfluidic channel network on the PDMS slab was bonded to a glass slide (50 mm×75 mm, Dow Corning) by exposing the PDMS slab and the glass to an oxygen plasma (Pico, Diener Plasma) for 1 min and bringing them in contact after exposure. As last step, a fluorophilic coating was applied to the microfluidic channel walls by flushing the network with a 1% (v/v) silane (Alfa Aesar, L16584) in HFE-7500 (Novec, 3M) solution, followed by rinsing the channel with HFE-7500 and purging remaining HFE-7500 with pressurised nitrogen gas.

Instrumentation Setup

For droplet production and reinjection, experiments were carried out on an inverted, epi-fluorescent microscope (TiE, Nikon, France), which has been modified and connected with a 488 nm, 561 nm and 638 nm laser (Omicron, Germany) and 4 photomultiplier tubes (PMT) (H10723, Hamamatsu) with corresponding band pass filters (PMT1: 440/40, PMT2: 525/40, PMT3: 593/46, PMT4: 708/75, PMT5: 809/81, Semrock). The signal from the PMTs was fed into an FPGA card (NI-USB7856R, National Instruments) and droplet data recorded with a proprietary software routine (uDrop 3.5-3.9, HiFiBiO).

A high-speed camera (Phantom Series, Vision Research) was attached to the left port of the microscope to monitor droplet production and cell encapsulation. A 5-channel syringe pump (Nemesys, Cetoni) was used to drive all fluids in the microfluidic chip.

For static droplet arrays, excitation light was provided by a LED source (SOLA light engine, Lumencor Inc.). Fluorescence signals for the specific channels were recorded using appropriate bandpass filters (GFP and TRITC filter sets, Nikon, and Cy5 filter set, Semrock) and camera settings (Orca R2, Hamamatsu) at room temperature (25° C.) and ambient oxygen concentrations. Images were acquired using a 10× objective (NA 0.45).

Cell Culture & Cell Labelling

The CHO-S (Freestyle, ThermoFisher) cell line was cultured in sterile Erlenmayer flasks on an orbital shaker at 125 rpm in a standard cell culture incubator (37° C., 5% $CO_2$). The cells were cultured in CHO-S Freestyle medium supplemented with penicillin/streptomycin, 0.5% Pluronic F-68 (ThermoFisher), and L-Glutamine.

Cell suspensions were typically labelled with Calcein AM Green, CellTracker Orange, CellTracker Red or NucRed (all ThermoFisher) according to standard protocols provided by the manufacturer.

Preparation Cellulose

2% (w/w) methyl-cellulose (Sigma-Aldrich) was dissolved in D.I. water under agitation using a magnetic stirrer and stirrer bar (500 RPM-2000 RPM) in an Erlenmayer flask at room temperature.

Cell Encapsulation Procedure & Monitoring

Cells were harvested and filtered through a 15 um, 10 um filter. Counting by flow cytometer (Guava EasyCyte, Millipore) and cell concentration was adjusted to 10 m-80 m cells/mL. Cells were then aspirated into custom-made reservoirs which are compatible with the microfluidic devices. The continuous phase consisted of 2% (w/w) 008-Fluoro-Surfactant (RAN Biotechnologies) in Novec HFE7500 fluorinated oil. Aqueous phases were co-flowed on-chip. The flow rates (around 1000-6000 µl/h for oil, and 100-800 µl/h for each aqueous solution were adjusted to generate typically monodisperse droplets of 80 to 400 pl to measure the effect of loading. During droplet formation, the cell suspension was cooled to ~5° C. using a homemade accessory to slow down antibody secretion and preserve cell viability. Data were collected using the laser/PMT system or using high speed imaging at rates of 10'000 to 100'000 frames per second. In case the laser/PMT system was used for measurements, data processing and analysis was carried out by uDrop. In case droplets were imaged using a static droplet array, the emulsion was either directly injected into the 2D chamber system, or collected in a 1.5 ml Eppendorf tube containing fluorinated oil with 0.1% (w/w) 008-FluoroSurfactant, either on ice (cell experiments) or at room temperature (cell-free experiments). If collected in a tube, the droplets were diluted 1:1 using fluorinated oil containing 0.1% (w/w) 008-FluoroSurfactant before introduction into the observation chamber using a custom-made PDMS valve. Droplets were re-injected into the chamber using a flow rate of 750 µl/h. After chamber filling was complete, the chamber was gently closed and mounted onto a fluorescence microscope (Ti Eclipse, Nikon).

Image Analysis

High-speed images were processed using a proprietary ImageJ and Matlab routine. Using ImageJ, mean gray levels of an area of interest were extracted over time resulting in a gray level curve. In Matlab, further image processing was carried out by removal of the background (mean gray level of the entire curve) and inversion of the signal resulted in a curve with peaks representing cells.

The routine would determine the spacing between peaks using a built-in function and then the data was aggregated into a histogram.

The invention claimed is:

1. A method for ordering, sorting or focusing particles in a first microfluidic channel system, the method comprising the steps of:
   i. providing a first microfluidic channel which is substantially straight, and which comprises at least a first inlet, a second inlet and a first outlet, ii. injecting a first fluid into the first microfluidic channel through said first inlet, iii. injecting a second fluid into the first microfluidic channel through said second inlet, wherein the viscosity of the first fluid is higher than the viscosity of the second fluid, such that the first fluid and the second fluid flow in a laminar fashion unmixed side by side for at least the length of said first microfluidic channel, and wherein the second fluid comprises the particles to be ordered, sorted or focused, and iv. encapsulating at least one particle in a droplet when said droplet leaves said first outlet, and wherein said particles are cells or beads, and wherein the viscosity of the first fluid is selected such that the particles in the second fluid are confined by the first fluid to a space occupied by the second fluid.

2. The method of claim 1, wherein the height of the first microfluidic channel is selected from the group of between 2 μm and 60 μm, between 5 μm and 50 μm, between 10 μm and 45 μm, between 15 μm and 40 μm, and between 25 μm and 35 μm.

3. The method of claim 1, wherein an angle between the first inlet to the second inlet is below or equal to 180°.

4. The method of claim 1, wherein the first microfluidic channel has a length of at least one of between 1 mm and 40 mm, between 2 mm and 35 mm, between 5 mm and 25 mm, between 8 mm and 20 mm, between 10 mm and 20 mm, and between 12 mm and 18 mm.

5. The method of claim 1, wherein the first and the second fluid are aqueous fluids, and
(1) wherein the viscosity of the first fluid is between 100 cP and 2000 cP, and the viscosity of the second fluid is between 0.001 cP and 100 cP;
(2) wherein the viscosity of the first fluid and the second fluid is between 0.001 cP and 100 cP; or,
(3) wherein the second fluid has a viscosity of about 1 cP, and the first fluid has a viscosity twice that of the second fluid.

6. The method of claim 5, wherein the aqueous first fluid comprises at least one of an organic polymer, a natural polymer, cellulose, glucose, fructose, or any other Q sugar, DNA, RNA, poly(ethylene glycol), poly(ethylene glycol) diacrylate, bis-acrylamide, polyacrylamide, streptavidin-acrylamide, poly-N-acrylamide, poly-N-isopropylpolyacrylamide, agarose, alginic acid and mixtures thereof.

7. The method of claim 1, wherein the first microfluidic channel comprises a third inlet.

8. The method of claim 7, wherein further comprising: injecting a third fluid in the third inlet, and wherein the viscosity of each of the first fluid, the second fluid, and the third fluid is selected such that first fluid separates the second fluid from the third fluid and such that all three fluids flow in a laminar manner substantially unmixed for at least the length of the first microfluidic channel.

9. The method of claim 1, wherein the particles comprise at least one of, a single cell, an aggregate of cells, a eukaryotic cell, a prokaryotic cell, a bead, or a hydrogel bead.

10. The method of claim 1, further comprising:
v. providing a second microfluidic channel comprising at least a fourth inlet, a fifth inlet and a second outlet,
vi. injecting a fourth fluid into the second microfluidic channel through said fourth inlet,
vii. injecting a fifth fluid into the second microfluidic channel through said fifth inlet, wherein the viscosity of the fourth fluid is higher than the viscosity of the fifth fluid, such that the fourth fluid and the fifth fluid flow in a laminar fashion unmixed side by side, and one of the fourth fluid and the fifth fluid comprises the particles; and
viii. joining the first outlet of the first microfluidic channel and the second outlet of the second microfluidic channel the outlets of both systems arc joined in one common channel.

11. A method for sorting different particles into one droplet, the method comprising the steps of:
i. providing a first microfluidic channel comprising at least a first inlet, a second inlet and a first outlet,
ii. injecting a first fluid into the first microfluidic channel through said first inlet,
iii. injecting a second fluid into the first microfluidic channel through said second inlet, wherein the viscosity of the first fluid is higher than the viscosity of the second fluid, such that the first fluid and the second fluid flow in a laminar fashion unmixed side by side,
iv. sorting a plurality of particles in the second fluid, wherein the viscosity of the first fluid is selected such that the particles in the second fluid are confined by the first fluid to a space occupied by the second fluid, and
v. encapsulating at least one particle in a droplet;
wherein the particles are cells or beads.

12. The method of claim 9, wherein the particles comprise a first plurality of cells, and wherein a plurality of droplets encapsulate the first plurality of cells, such that each cell of the first plurality of cells is encapsulated in a different droplet.

13. The method of claim 12, wherein the particles comprise a second plurality of cells, and wherein the plurality of droplets encapsulate the second plurality of cells, such that each cell of the second plurality of cells is encapsulated in a different droplet with a cell from the first plurality of cells.

14. The method of claim 13, wherein more than 20% of the droplets each contain a cell from each of the first plurality and the second plurality of cells.

15. The method of claim 12, wherein each cell is co-encapsulated with a non-cellular particle in the respective droplet.

16. The method of claim 1, wherein a plurality of droplets encapsulate the particles, and wherein each droplet comprises no more than one particle.

17. The method of claim 1, wherein a plurality of droplets encapsulate the particles, and wherein the amount of droplets with at least one particle is enriched as compared to the Poisson distribution.

18. The method of claim 1, wherein a flow rate of said first fluid is lower than a flow rate of said second fluid.

* * * * *